(12) United States Patent
Meier et al.

(10) Patent No.: US 11,232,498 B2
(45) Date of Patent: Jan. 25, 2022

(54) METHOD, SYSTEM, AND COMPUTER READABLE MEDIUM FOR LABELING AND DISTRIBUTING PRODUCTS HAVING MULTIPLE VERSIONS WITH RECIPIENT VERSION CORRELATION ON A PER USER BASIS

(71) Applicant: Penrose Hill, New York, NY (US)

(72) Inventors: Carolin Meier, Albany, CA (US);
Philip James, New York, NY (US);
Erik Steigler, New York, NY (US);
Matthew K. Martz, Chapel Hill, NC (US)

(73) Assignee: Penrose Hill, New York, NY (US)

(*) Notice: Subject to any disclaimer, the term of this patent is extended or adjusted under 35 U.S.C. 154(b) by 56 days.

(21) Appl. No.: 16/560,778

(22) Filed: Sep. 4, 2019

(65) Prior Publication Data
US 2020/0074517 A1    Mar. 5, 2020

Related U.S. Application Data

(60) Provisional application No. 62/726,686, filed on Sep. 4, 2018.

(51) Int. Cl.
*G06Q 30/00*    (2012.01)
*G06Q 30/06*    (2012.01)
*G06Q 30/02*    (2012.01)

(52) U.S. Cl.
CPC ..... *G06Q 30/0603* (2013.01); *G06Q 30/0282* (2013.01); *G06Q 30/0621* (2013.01)

(58) Field of Classification Search
CPC . G06Q 30/0601–0645; G06Q 30/0621; G06Q 30/02; G06Q 30/0282; G06F 3/12
USPC ......................... 705/26.1–27.2, 347
See application file for complete search history.

(56) References Cited

U.S. PATENT DOCUMENTS

| | | | |
|---|---|---|---|
| 6,246,326 B1* | 6/2001 | Wiklof ................ | G06K 19/077 340/572.1 |
| 8,719,347 B1* | 5/2014 | Tomkins ............... | G06F 16/951 709/204 |
| 2013/0080438 A1* | 3/2013 | Tompkins ............. | G06F 16/285 707/740 |
| 2016/0063595 A1* | 3/2016 | Oral .................... | G06Q 30/0631 705/26.7 |
| 2017/0103447 A1* | 4/2017 | Brandenberg ..... | G06Q 30/0631 |
| 2017/0236051 A1* | 8/2017 | van der Made ....... | G06N 3/088 706/27 |
| 2018/0047071 A1* | 2/2018 | Hsu .................... | G06Q 30/0282 |
| 2018/0315094 A1* | 11/2018 | Ashoori ................ | G10L 25/48 |

OTHER PUBLICATIONS

Doucleff, Michaeleen. "Drinking With Your Eyes: How Wine Labels Trick Us Into Buying" (2013) NPR. (Year: 2013).*
Boys, Callan. "Can you judge a wine by its label?" (2016) GoodFood.com (Year: 2016).*

(Continued)

*Primary Examiner* — Allison G Wood
*Assistant Examiner* — Katherine A Barlow
(74) *Attorney, Agent, or Firm* — Buckley, Maschoff & Talwalkar LLC

(57) ABSTRACT

Embodiments are directed to labeling and distributing products having multiple versions while providing correlation of user ratings with a received product version on a per user basis.

18 Claims, 11 Drawing Sheets

(56) References Cited

OTHER PUBLICATIONS

Bi, Hui et. al. "Accurate image segmentation using Gaussian mixture model with saliency map" Dec. 27, 2017. Pattern Analysis and Applications, pp. 869-878. (Year: 2017).*

Sun, Xie et. al. "New Methods for Template Selection and Compression in Continuous Speech Recognition" Aug. 31, 2011. Interspeech, pp. 985-988. (Year: 2011).*

Rasmussen, Carl. "The Infinite Gaussian Mixture Model" 2000. Advances in Neural Information Processing Systems, pp. 554-560. (Year: 2000).*

* cited by examiner

METHOD, SYSTEM, AND COMPUTER READABLE MEDIUM FOR LABELING AND DISTRIBUTING PRODUCTS HAVING MULTIPLE VERSIONS WITH RECIPIENT VERSION CORRELATION ON A PER USER BASIS

CROSS REFERENCE TO RELATED APPLICATION

This application claims the benefit of and priority to U.S. Provisional Patent Application Ser. No. 62/726,686 filed on Sep. 4, 2018, the contents of which are hereby incorporated by reference in their entirety for all purposes.

FIELD OF THE INVENTION

The disclosed embodiments are directed to labeling and distributing products having multiple versions while providing correlation of user ratings with a received product version on a per user basis.

BACKGROUND

Conventional approaches to the production of consumer products are designed around efficiency and economies of scale, so whether one is manufacturing toothpaste or running a winery producing chardonnay, the objective is to put together a large production run so that everything is cheaper. In the case of labeled bottles of wine, efficiency is achieved by buying or producing a large quantity of bottles of chardonnay, for example, and a large quantity of labels and running a labeling line continuously over an extended period of time. When the labeling of the chardonnay is completed, then one might proceed with labeling a different type of wine, such as cabernet sauvignon. Thus, in conventional approaches to product labeling and distribution, an entire production run of a product is labeled with the same label for consistency and pricing efficiency, because high-volume runs are cheaper.

In conventional approaches to product brand/label design, a company might hire an agency, perhaps providing a creative brief. The agency would come up with brand/labeling ideas, and a decision maker would pick an idea and have the agency develop it. Also, research would be done to avoid competing brands/labeling. In the case of wine, a large winery might do consumer testing, e.g., having 10 people in a room with a 2-way mirror and watching them react to wines on shelf. Such approaches may be more inclined to indulge the predilections of the decision maker, e.g., a winery owner, rather than resulting in an objective and systematic consideration of consumer views.

SUMMARY

The disclosed embodiments provide a platform for controlling branding, labeling, and distribution of products, e.g., consumable items, based on machine learning processes derived from user ratings of products randomly labeled with different versions of branding/labeling. The consumable item may be wine, e.g., bottles of wine distributed via a website store or wine club. Panels of defined brand/label characteristics of the wines may be obtained in a systematic manner. The brand/label data may be used to build a user level model which may be used, for example, to establish a user preference profile and provide recommendations to the entity responsible for branding and labeling. The brand/label data may also be used to build Gaussian Mixture Models (GMM) which are a form of machine learning. A GMM model may be used to look at distributions of subsets of data and generate novel data that fits well within a given distribution. Such models can be used to create "algorithmic" branding/labeling, e.g., wine labels. Deep learning models may be used to build neural networks to perform functions such as generating wine labels and performing high-dimensional clustering of wine labeling and branding attributes. The branding/labeling data may be input into dynamic time warping (DTW) alignment calculations which perform mathematical operations to determine how different the characteristic vectors are from one another. The results may be used to build a model of spatial ranking (SR), which is stored. DTW can be used to align vectors which are non-linear and widely distributed and collapse them into the same vector space. This includes calculating an energy cost to collapsing the vectors into the same space, i.e., a measure of how different the vectors are from one another.

In one aspect, the disclosed embodiments provide a method (and corresponding system and software) for labeling and distributing products having multiple versions with recipient version correlation on a per user basis. The method includes storing, on at least one server having a processor and memory, one or more values characterizing a first label, each of the values being associated with a label characteristic of a defined set of label characteristics. The method further includes storing, on the at least one server, one or more values characterizing a second label, each of the values being associated with a label characteristic of the defined set of label characteristics. The method further includes labeling a first group of a product with the first label and a second group of the product with the second label. The method further includes distributing the product from the first group and from the second group to users in response to user orders for the product, wherein each user has an account stored at the at least one server. The method further includes receiving, from the users, user ratings for the product, each of the user ratings being identified as associated with the first group or the second group depending on whether, in the distributing, a user providing each of the user ratings received the product from the first group or from the second group. The method further includes correlating the user ratings with the values of the label characteristics.

Aspects of the disclosed embodiments may include one or more of the following features. The correlating of the user ratings with the values of the label characteristics may include a regression. The correlating of the user ratings with the values of the label characteristics may include a machine learning algorithm. The label characteristics may include one or more of the following: modern vs. traditional, abstract vs. figurative, award medals, color, font size. The first label and the second label may be based on results of a survey sent to a group of consumers. The group of consumers may be selected according to demographic characteristics. The first label and the second label may be produced by varying at least one label characteristic of the defined set of label characteristics of a label selected based on the results of the survey.

DETAILED DESCRIPTION

Figure 1:
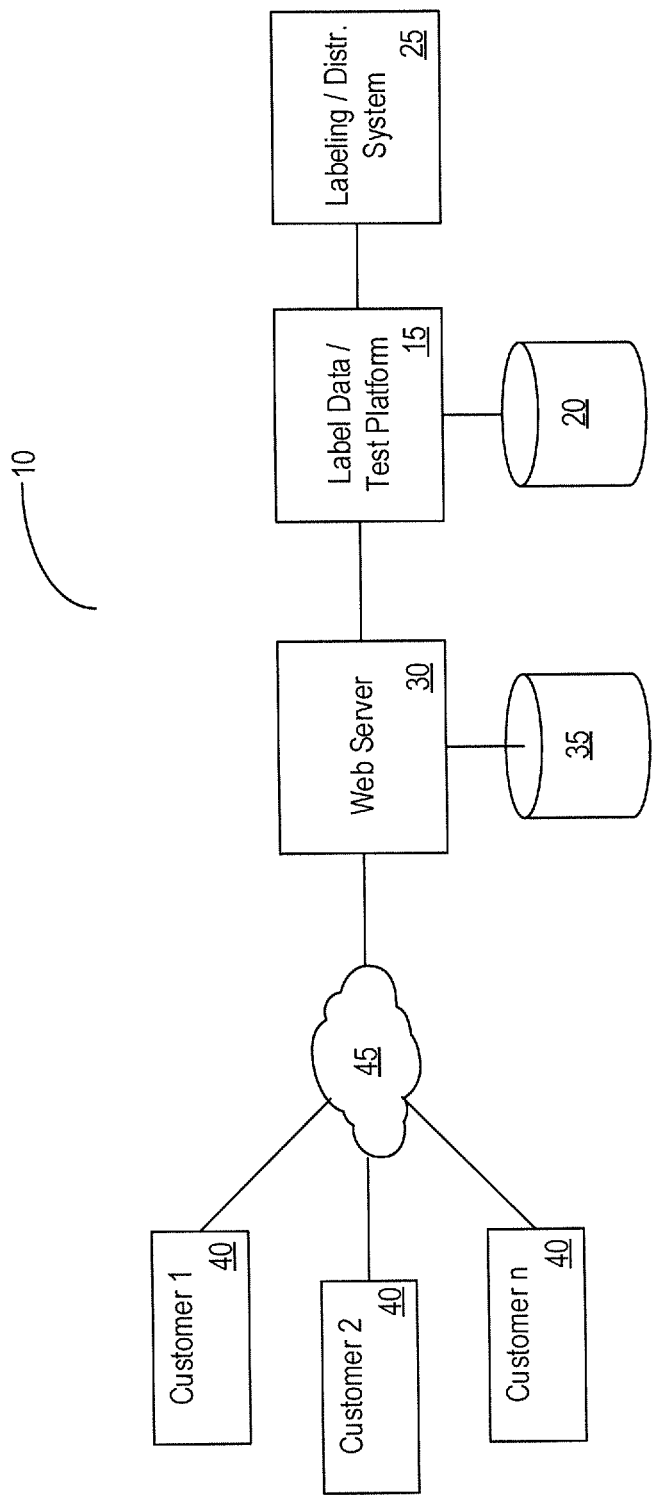
FIG. 1 depicts a system for labeling and distributing products having multiple versions with recipient version correlation on a per user basis.

FIG. 1 depicts a system 10 for labeling and distributing products having multiple versions with recipient version correlation on a per user basis. The system includes a label data and test platform server 15, having a processor and memory, for storing, e.g., in a database 20, one or more values characterizing a set of products or product labels pursuant to some embodiments of the present invention. For the purpose of explaining features of some embodiments, a specific type of product and product label will be described herein—wine and wine labels, although those skilled in the art, upon reading the present disclosure, will appreciate that features of some embodiments may be used with desirable results in conjunction with other types of products, product labels, packaging or the like.

In the case of wine labels, each of the values is associated with a label characteristic of a defined set of label characteristics, e.g., font style, font size, font color, category of images (e.g., animals, grape vines, winery chateau, etc.), background color, etc. A number of other characteristics may also be used, for example print techniques (e.g., identifying a label shape, a material, an embossing or debossing technique, etc.).

As shown in FIG. 1, the system 10 includes a labeling subsystem 25 (discussed in further detail below) which may be operated to label products. More particularly, pursuant to some embodiments, the labeling subsystem 25 may be operated to label products on demand. For example, the labeling subsystem 25 may be operated to apply a first label to a first group of a product (e.g., a specific brand and vintage of wine) and to apply a second label to a second group of the same product (e.g., the same brand and vintage of wine). To describe features of some embodiments of the present invention, an illustrative but not limiting example will be provided. In the example, the customers 40 are members of a wine club operated by an entity that operates the system 10. The customers 40 each have accounts with the entity and receive wine products each month. In the example a specific bottle of wine is to be shipped to customers as part of their monthly subscription. Rather than receiving the same bottle with the same label, different customers may receive the bottle with a different label. In the example, only a first and a second label will be described, although in some embodiments, multiple variations may be used. In the example, each customer 40 is asked to rate and comment on the wines received. Pursuant to some embodiments, the ratings may be star ratings (e.g., with a scale from zero to five stars, with five stars being the highest rating), and the comments may be provided via a free form text field on a web form. Those skilled in the art upon reading this disclosure will appreciate that other rating and feedback approaches may be used.

The system 10 further includes a web server 30, having an associated database 35, for hosting a website for distributing the product from the first group and from the second group to customers 40. As shown, a plurality of customers 40 are in communication with the server 30 via a network 45. The customers 40 may operate computing devices (such as, for example, mobile phones, computers, or the like) to interact with the web server 30 in order to place orders for products. In some embodiment, each customer 40 has an associated account with an entity operating the web server 30 allowing the customer's order (and order history) to be tracked and associated with the customer 40. Pursuant to some embodiments, customers may interact with the web server 30 to select or otherwise place orders for products.

In some cases, the website hosting server 30 may be the same server 15 as the one described above for managing label characteristics. The website may host a wine club (and/or a wine sales site), in which case each customer 40 has an account stored at the website server 30. The distribution may involve sending wine bottles labeled with the first or second label randomly to the wine club customers 40. The customers may not be aware that there is more than one version of the label. The system 10 maintains information identifying which customers 40 received which label version.

The system 10 provides for receiving, from the wine club customers 40, user ratings for the product. For example, the customers may be prompted to rate the wine (not the label itself). The customers may be prompted to enter their ratings and any comments in a web form associated with the web server 30 or in response to a comment or feedback form. The user ratings are identified as associated with the first group or the second group depending on whether a customer 40 received the product from the first group or from the second group, respectively. Thus, all of the customers 40 may receive the same product but with one or the other of the two labels being tested (in the disclosed embodiment there are two labels being tested but comparison of three or more labels is also possible, as noted above). In such a case, the distribution of the two different labels among the customers may be done, for example, in a random manner.

The user ratings are correlated with the values of the label characteristics. For example, in a simple case, the user ratings associated with the first and second labels may be compared to determine which label garnered a better reaction from the customers (it is assumed that difference in the user ratings of the wine are due to the customer's reaction to the label, as the product itself is the same). Other types of analysis may also be performed based on the user ratings. For example, the two labels being tested have different label characteristics and the ratings may be correlated with the particular values of the label characteristics, e.g., by performing a regression or by applying a machine learning algorithm. In this way, the effects of each label characteristic, e.g., font size, can be evaluated separately.

Disclosed embodiments provide a systematic method of producing better product labels/brands and, provide techniques by which product labels are systematically made better (e.g., more appealing to the consumer). In some cases, user response (e.g., user ratings and/or comments), may be gathered once a product is in market. A set of brand characteristics and brand subject matter may be defined in which a numeric value is assigned to each characteristic. For example, a product label may be characterized in terms of, e.g., modern/abstract v. traditional/restrained, etc. A code may be assigned to each of these characteristics on produced labels to compare the "DNA" of the label to actual consumer feedback on a per user basis. In other words, the user ratings provided by each individual user can be correlated with a particular product version having a particular set of characteristics.

Pursuant to some embodiments, a plurality of product labels may be generated and sent to consumers as part of a survey, e.g., via a text message to the users' mobile devices. This may be done using software which provides templates for creating surveys and which allows for the specification of demographics, e.g., age, number of children, income, etc., for the survey recipients. Such a survey may be done very soon after generation of the labels, e.g., in less than an hour, and the text message may be sent to many, e.g., thousands, of consumers. The survey may present, e.g., two or three different labels and may indicate to the consumer that they are in a particular demographic from which opinions are being sought. The survey may ask which label is most appealing, which one would the consumer pay $20 for, and/or which label puts the consumer "in a good mood," etc. The survey may result in quick feedback, e.g., within an hour or so. Several versions, e.g., two or three versions, may be generated of a label which receives high ratings in the survey.

As explained above, products, e.g., wine, may be labeled with label variations A, B, and C generated based on the survey results and may be sold/distributed to consumers. The consumers may not be aware that the product is being distributed with varied labels. For example, a first consumer may receive a product, e.g., a bottle of wine, which has a frog on the label ("Label A"). A second consumer may receive the same bottle wine, i.e., the exact same product, with a different image, such as a newt ("Label B") or a vine ("Label C), instead of the frog. In such a case, a difference in consumer ratings of the identical wine bottled under the three different label variations may be considered to indicate a preference for the labeling itself. In disclosed embodiments, the wine may be distributed via a direct-to-consumer wine club which is in contact with the end consumer all the time. In such a case, it can be determined who rated a wine with a particular label variation higher. In other words, it can be determined whether there was a perception of quality or taste difference based only on label, e.g., a label with a newt versus one with a frog. This information may be provided to a brand team so that they know what to use on the wine label, i.e., a newt or a frog. Testing conducted in this manner could be used to refine a label even further, e.g., by testing whether there is a difference in user ratings between a label version having a blue newt versus a label version having a red newt.

As explained above, the survey steps may be used in conjunction with a specialized production line on which the same wine is bottled with multiple variations in labeling/ packaging. For example, a survey might be used to determine whether displaying an award medal on the label of a wine bottle improves the perception of wine. This could be followed by a production run in which a portion of the bottles have a label with a medal on it, while the remainder have a label without a medal. User ratings may be obtained from users who have received the wine labeled randomly with one of the two label versions. In experiments using the present invention, a 6-7% increase in customer satisfaction for the same wine, same name, same brand, etc., with the only difference being a gold medal on the label. Thus, it has been found that including an award medal on the label provides a significant increase in customer satisfaction but does not increase costs. By way of comparison, the difference in user ratings for a poor-quality merlot and a good merlot might be about 10%.

In disclosed embodiments, an analysis may be made of product branding/labeling using axes of, e.g., new vs. traditional, whimsical vs. serious, etc. The analysis may be used to identify "gaps" in product branding/labeling and distribution. For example, the analysis may find that a winery does not have a California wine that is "whimsical and youthful."

In disclosed embodiments, production lines may be labeling bottles of a particular wine with different labels and distributing the wine through the wine club managed and accessed via the website. In such a case, data relating to the distribution of the wine and the resulting user ratings may be constantly obtained and analyzed. A customer signing up for a wine club may specify particular preferences, e.g. red wine only, U.S. wine only, which reduces the set of products which is sent to the customer. An algorithm may be used to pick wines, e.g., based on chemical profiles, without regard to brand. Unbeknownst to the customer, the algorithm may select a wine for which there are two different labels, e.g., a wine having a production run of 30,000 bottles, of which 15,000 bottles have "Label A" and the remainder have "Label B," in a random distribution.

Pursuant to some embodiments, customers 40 are encouraged to rate the wines they receive, (e.g., to allow each customer's preferences to influence which wines the customer receives in the wine club), and also to provide text reviews. Pursuant to some embodiments, the text reviews or comments are analyzed using natural language processing ("NLP") techniques to extract and classify comments from customers. In some embodiments, trained personnel may be used to review and normalize comments (either aided by or in lieu of automated text analysis). In general, embodiments classify or normalize comments allowing the feedback to be classified into categories associated with the product, such as the print technique (the label shape, etc.), the style (e.g., modern, masculine, bold, dark, light, etc.), the mood (e.g., serious, whimsical, etc.), and the subject (e.g., geographical, historical, cultural, etc.).

In some embodiments, the text reviews are read and interpreted by either (or both) of a trained NLP classifier or by trained personnel, because customers may not use the same terms a wine taster would use (e.g., a comment stating "this wine burned my throat" may be interpreted to mean that the wine has too much alcohol or tannins). Based on the received user ratings and interpreted comments, a series of dashboards may be provided on the wine making side and business side. The business users can pull up the two versions of wine labels and look at the differences, including total user rating score and common words used to describe the two different versions. For example, a wine distributed with a label version without an award medal may be described as "rich" and "fruity," whereas the same wine distributed with a label which displays an award medal may be described as "high quality and good value." The business user can see the difference in the user rating scores, e.g., the wine without an award medal on the label may be rated positively by 80% of users, whereas the same wine with an award medal on the label may be rated positively by 86% of users.

In disclosed embodiments, an Internet-based "club" format may be used to distribute products, such as, for example, a wine club. In this context, the distributor has definitive information on the source of user ratings, which can be used to personalize the wines that are distributed to each user based on the user's expressed preferences. In addition, user rating data may be used to evaluate wines and their branding/labeling. By contrast, if a winery distributes wine through a grocery store, then they do not know who the end customer is and whether they will buy wine again. For example, the customer might pay cash or buy the same wine later in another store. In such cases, there is no systematic record of who the customer is.

In disclosed embodiments, products, e.g., wines, having different label versions may each be distributed with a different unique identifier, e.g., a different stock keeping unit (SKU). For example, a SKU may begin with "RWCABCA" to indicate that the product is a red wine, a cabernet, and from California. This may be followed by a code indicating a brand name and then a sequential identifier corresponding to the various test versions, e.g., test labels. In such a case, the different versions of a product, e.g., a wine having different label versions, may be treated as separate products in the warehouse and in the packing line, but to the customer, they may appear to be the same product.

In disclosed embodiments, characteristics of a product other than labeling or branding may be varied and randomly distributed. For example, a wine may be produced in versions which have two different levels of sugar to assess user preference for sweetness. In such a case, a particular level of sugar, e.g., 5 g/l, which is dry but on the sweeter side, may be found to be optimal, whereas European wines typically have 0-3 g/l of sugar. Such tests are helpful in determining what a customer really wants in a wine. For example, a customer may say that they want a "sweet" wine, but in the wine industry that term corresponds to wines with 20 g/l of sugar. It may turn out that the customer actually prefers wines having levels of sugar that are considered dry (not even off-dry) in the wine industry. Thus, this indirect evaluation of wine sweetness may overcome a discrepancy in terminology between the customer and the wine makers and distributors.

As a further example, a wine may be distributed in two versions, one with a cork and one with a screw cap to ascertain whether customers' perceptions of a screw cap have a negative impact on a wine's ratings. As a further example, a wine may be distributed in a version with heavy glass (e.g., 650 g) and a lighter glass (e.g., 500 g) to determine whether it is worth paying the additional cost to use heavy glass.

The randomized distribution of different versions of the same product, while treating the versions as a single product vis-à-vis the customer, allows product characteristics to be evaluated indirectly, which helps to reduce subjective bias. For example, a customer may respond to a direct question regarding their preference for wine bottles with lighter glass or heavier glass by indicating that they do not have a preference or, perhaps, that they prefer lighter glass. However, data from randomized distribution of versions of the same wine bottled with lighter and heavier glass may reveal higher user ratings for heavy glass. Such experiments can easily be run across fifty thousand customers, whereas a typical winery which does not have a "club" customer base would find it difficult to find such a large test population.

Figure 10:
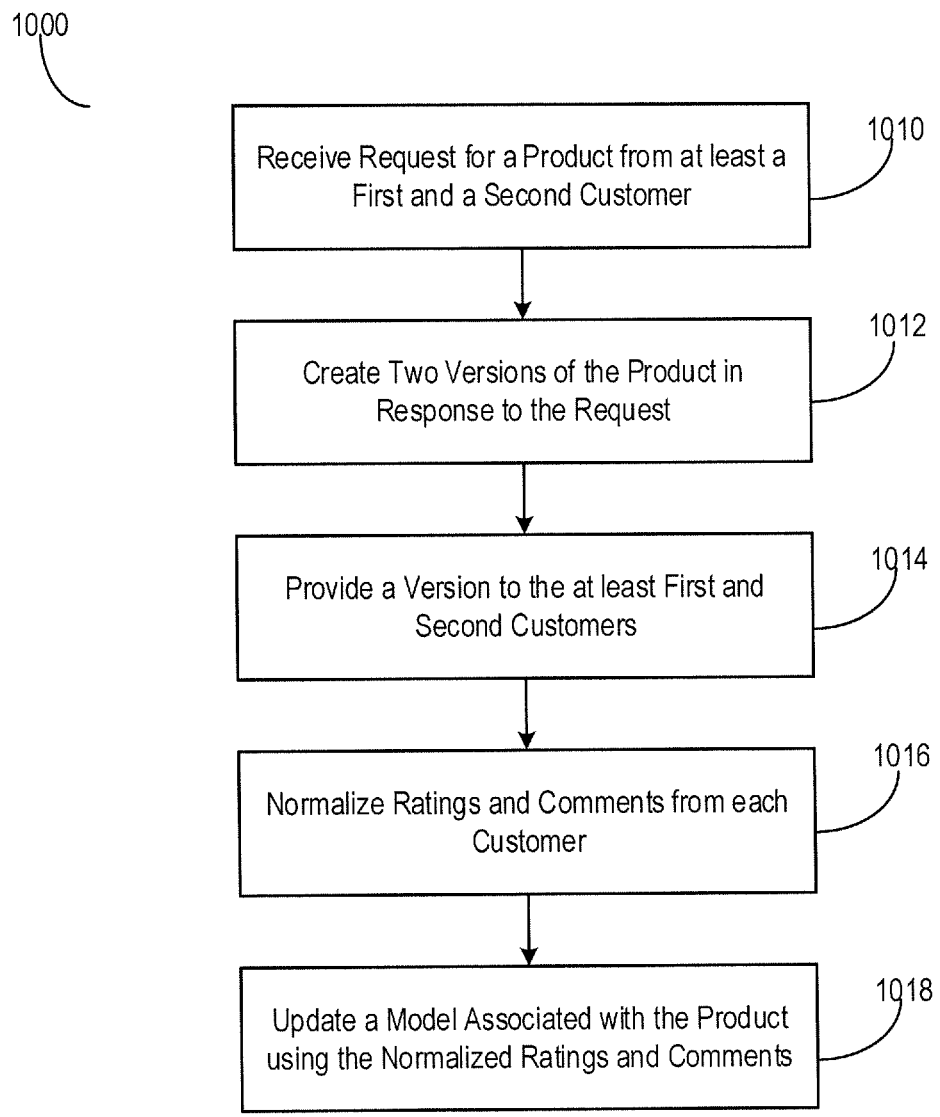
FIG. 10 is a flow diagram depicting a process pursuant to some embodiments.

Further details of features of some embodiments will now be described by referring to several flow diagrams that describe processes that may be performed by an application performed by a computing device or a group of computing devices, such as a user device, a web server, a host platform, a cloud computing environment, and the like to implement features of the present invention. Reference is now made to FIG. 10, where a flow diagram depicting a process 1000 that may be performed by the system 10 is shown. The process 1000 may be performed to improve a model used to identify the most desirable product label for use with a specific product. The process 1000 may be performed a number of times to continuously improve the model for that product. Process 1000 begins at 1010 where the system 10 receives a request for a product from at least a first and a second customer. As discussed above, the request may be in association with an online order of a product, in conjunction with a request to receive a product in a continuity or subscription club, or the like. Once the request has been received or otherwise identified, processing continues at 1012 where the system is operated to create two versions of the product in response to the request. As discussed above, the processing may not create two distinct products, but instead creates two different labels for the product. The two versions are identified by a version code. Processing continues at 1014 where the versions are fulfilled or otherwise provided to the customers (with one customer receiving a first version and the second customer receiving the second version). Processing continues at 1016 where the customers provide feedback associated with the product and the feedback (generally in the form of ratings and/or comments) are normalized. Processing continues at 1018 where the feedback from the customers is associated with the version code of each product label version and used to update a model associated with the product. In this manner, embodiments allow different product variations to be generated on demand and to capture feedback associated with those variations in a way that allows a model to be trained to improve the model's ability to identify product label attributes that are more desirable to customers.

Figure 2:
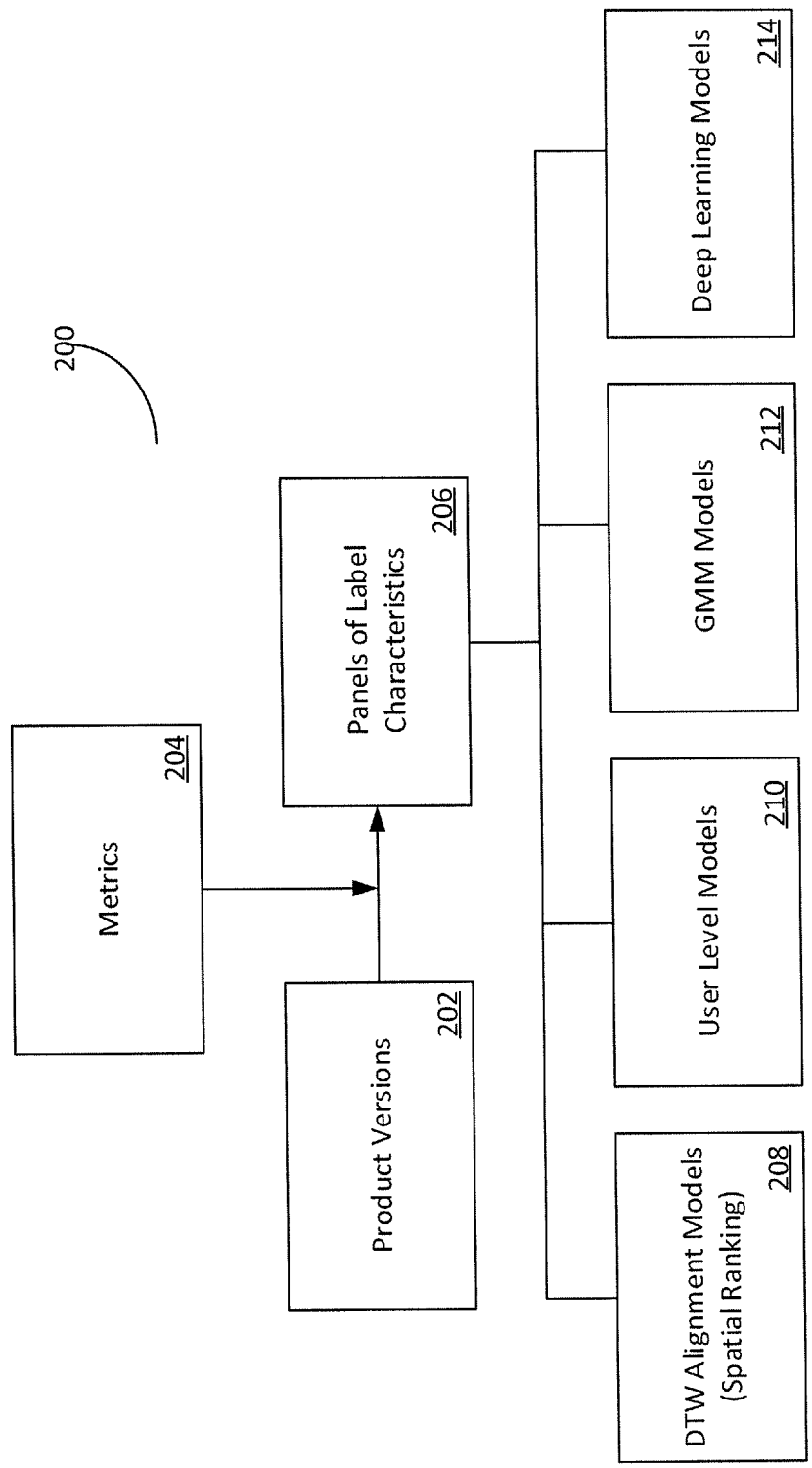
FIG. 2 is a diagram depicting data input to a platform for controlling labeling and distribution of products based on machine learning processes derived from profiles of product or product label characteristics.

FIG. 2 depicts data input to a platform for controlling labeling and distribution of products (again, in the illustrative embodiment, the products are wines) based on machine learning processes derived from profiles of product or product label characteristics. In disclosed embodiments, the product is a consumable item, e.g., bottles of wine distributed via a website store or wine club. Panels of defined label characteristics 206 of the wines may be determined in a systematic manner, e.g., by evaluation and numerical rating by experts and/or NLP processing, and these provide quantified attributes, such as, modern vs. traditional, abstract vs. figurative, award medals, color, font size, etc. The data may be in the form of a parsable data file, e.g., a CSV file, which is input to the platform. In disclosed embodiments, the panel of characteristics may be derived for product characteristics (as opposed to product label characteristics), such as, for example, acidity, sugar content, etc. In such a case, the evaluation of the characteristics may be done using experimental testing, e.g., chemical testing.

In disclosed embodiments, the standardized data is stored as a model object which is stored in cloud storage, e.g., Amazon S3 Cloud storage. This data is used in processes which are configured to pull down the defined brand/label characteristic panels for particular wines. In disclosed embodiments, there is a matrix in which lookups can be done using product stock keeping unit (SKU). The resulting vectors are attribute vectors in which each column is a defined attribute and the value in a particular cell in the vector is the assigned quantified value based on the evaluation. The defined brand/label characteristic panel matrix is stored in the cloud storage and the data can be pulled down as needed. The data can be used in various use cases/modalities, as discussed in further detail below.

In disclosed embodiments, the data may be input into dynamic time warping (DTW) alignment calculations 208 which perform mathematical operations to determine how different the defined brand/label characteristic vectors are from one another. The results may be used to build a spatial ranking (SR) model, which is stored. DTW can be used to align vectors which are non-linear and widely distributed and collapse them into the same vector space. This includes calculating an energy cost to collapsing the vectors into the same space, i.e., a measure of how different the vectors are from one another. DTW allows the vectors to move in high-dimensional space, can be numerically expedited with algorithms to control the warping window, allows for the application of non-standard local weights, handles comparison vectors of differing length, and can be efficiently scaled with the increase of vector length.

It is possible to keep track, in high-dimensional space, of where the differences are most significant. This results in a raw value, i.e., a unitless value, which can be used to create a "heat map" of vector alignment costs. For example, such a map could have SKU values defining rows and columns. The distance, i.e., alignment cost, between two SKUs can be determined for a particular point in time. As an example, reading down a column of a particular SKU (e.g., a particular version of a wine or wine label) would give the range of the alignment cost to all other SKUs for the particular wine.

DTW algorithms are commonly used in finance and audio-visual processing. For example, it can be used to determine how different two waveforms are from one another. In disclosed embodiments, DTW calculations may be performed using a coded module, e.g., using Python, which includes the necessary mathematical functions to perform the calculations. In disclosed embodiments, a coding (e.g., script) language, such as Python, may be used to code the entire platform. DTW data models may be stored, for example, in a Python data format and the pre-computed models are stored in cloud storage.

The panels of defined brand/label characteristics can be used to build Gaussian Mixture Models (GMM) 212 which are a form of machine learning. A GMM model may be used to look at distributions of data and generate novel data that fits well within a given distribution. Such models can be used to create "algorithmic" products, e.g., algorithmic labels. Deep learning models 214 may be used to build neural networks to perform functions such as generating wine labels and performing high-dimensional product (e.g., wine) clustering.

In disclosed embodiments, the DTW model can be used in a DTW alignment use case when the business user is looking at a particular wine label, the website can present, e.g., the next five similar labels (not specific to the user, but specific to the wine being viewed currently).

Figure 3:
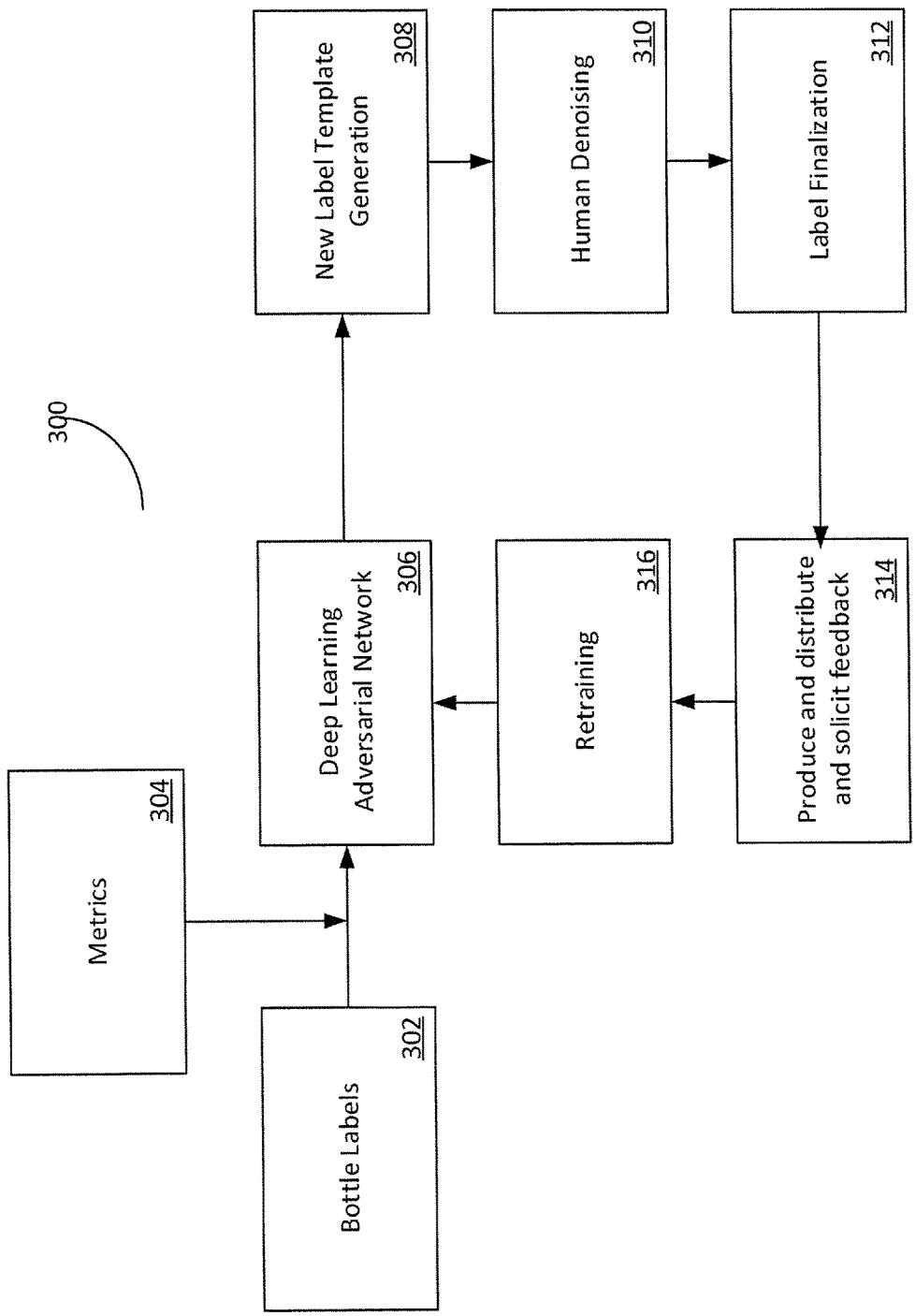
FIG. 3 is a diagram depicting algorithmic wine label template generation from a database of wine labels.

FIG. 3 is a diagram depicting algorithmic wine label template generation from a database of wine labels 302. In disclosed embodiments, there may be semi-supervised machine learning in which some metrics 304 are applied to early data. For example, a model can be trained on data relating to product labels (i.e., physical labels, as opposed to "labeled" data used in machine learning) along with some metrics, e.g., partial labels, with a percentage of likes received from customers. The algorithm can build the model by learning what makes a good label and a bad label, e.g., in the context of wine labels. The trained model can be queried for a new California red and the algorithm can use deep learning models to generate a noisy template of what a label would look like and its characteristics, e.g., color, font, shape, etc. This can be used as a foundation for completing a final label for a bottle.

In disclosed embodiments, a generative adversarial network (GAN) may be trained on classified data and later used to generate probabilities of features given a specific classification. If there were a sufficient number of labels and enough metrics to allow the algorithm to learn what makes a good label for a red wine, a white wine, a California red wine, etc., then the algorithm could generate label templates which could be used as the basis for a new label. Algorithms could also be used to determine what makes a "bad label," e.g., a label which results in negative ratings during NB testing in which two bottles of the same wine are given different labels to evaluate the appeal of the label (i.e., consumers will rate bottles of wine which, unbeknownst to the consumer, are randomly labeled with Label A or Label B). For example, with enough learning, the algorithm could learn what font size is good for a particular flavor profile.

In disclosed embodiments, wine bottle labels can be used to build a data set, which might be filtered with respect to a particular region of interest. Additional metrics may be added, such as, for example, ratings, SKU performance, seasonal performance (e.g., winter versus summer label performance), and the chemistry of the wine. A generative adversarial network 306 may be used to allow the algorithm to make things, rather than just classifying things. The algorithm produces a new label template 308 by generating features of high probability, and as such may be a noisy template. The template may define specific characteristics of a desirable label, such as, for example, color (e.g., blue), font type, size, and color, label background texture, placement of text. Denoising 310 may be performed by a user, e.g., by shifting elements, sketching of the actual text to be used on the label, and performing label finalization. In some embodiments, denoising 310 may be performed by one or more NLP processes (alone or in combination with human denoising). One or more versions of the label may be produced and compared to existing labels that have not been doing well so market testing can be used, e.g., A/B testing. The resulting data can be fed back into the learning network to retrain 316 the algorithm. As more labels are made by this process, or by hand, the algorithm will develop a greater depth of knowledge of how to generate desirable wine labels. In disclosed embodiments, there may be feed forward generation of data, application of denoising, collection of market data (or actual production shipments of the labeled products to consumers and solicitation of feedback therefrom 314) to label the results, i.e., in the supervised machine learning sense, and return them as inputs to the algorithm for retraining 316.

Figure 4:
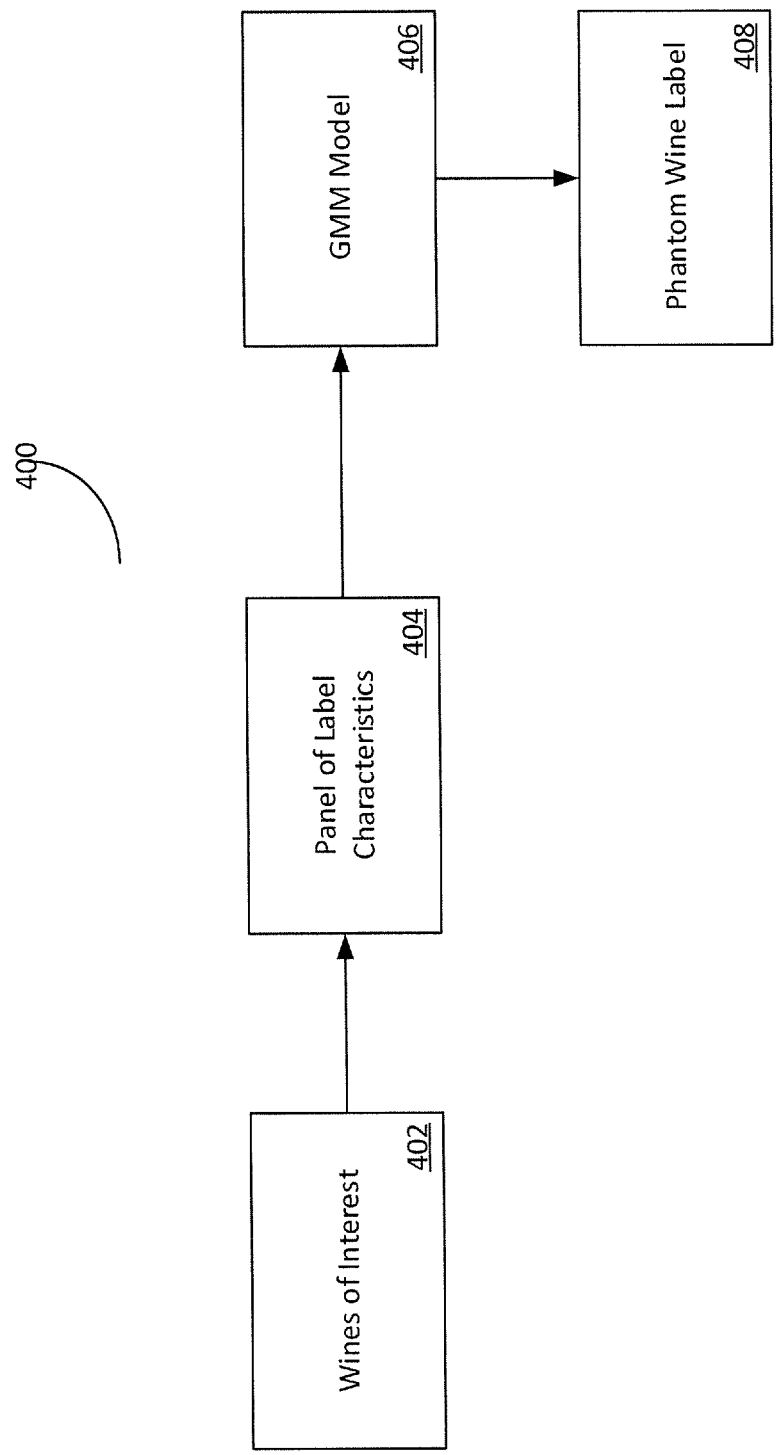
FIG. 4 is a diagram depicting algorithmic wine label characteristic panel generation from a set of existing labels of selected wines.

FIG. 4 is a diagram depicting algorithmic wine label characteristic panel generation from a set of existing labels of selected wines 402, e.g., wines that are top sellers in a particular wine category. In disclosed embodiments, the GMM model 406 receives panels of defined brand/label characteristics 404, or a subset thereof (e.g., based on user ratings, such as the top ten red wines), to create a specific distribution of label characteristics which will allow the GMM model to generate a novel data point, e.g., a novel wine label characteristic panel, that fits within a specific confined distribution of data. In effect, this is sampling of a given parameter space to obtain a set of representative parameters within a defined parameter space. For example, the GMM model could be used to obtain a good representative top ten wine label for California wines. The result may be referred to as an "algorithmic wine label," i.e., a mathematical representation of a wine label in the form of a panel of label characteristics, which may be used by a designer to create a label fitting the panel characteristics.

In disclosed embodiments, a GMM model may be created based on a request by the wine producer for new SKUs (i.e., products). For example, it may be desirable to produce a new red wine label which will fit into the top ten red wine labels in a particular region. In such a case, a new "phantom wine label" 408 can be created which will be different from all of them (i.e., the top ten wine labels) but will have representative label characteristics of the top ten wine labels. The result provides a new panel of label characteristics, which can be used to produce a label template (e.g., a set of characteristics relating to font size, label background and text color, label style, etc.) which can be given to the business user as a basis for a new label design. The process, thus, works backward from the label characteristics and seeks to produce a wine label that has the desired characteristics.

In disclosed embodiments, there may be defined sets of wine labels of interest, e.g., top ten California red wine labels. A corresponding filter is applied to the panels of defined brand/label characteristics to pull in stylistic attributes. A GMM model may be built which samples the parameter space and provides a result which fits within the parameter space. The model generates a new feature vector of label characteristics, as noted above, which may be referred to as an "algorithmic wine label," "phantom wine label," or "virtual wine label." This defines a wine label template which, if it existed, would have the characteristics that are representative of the applied set of criteria based on the wine labels of interest.

The phantom wine label 408 can be fed back to a design team to attempt to produce the hypothetical wine label. For example, there may be a number of label templates as a starting point, and the label designers try to create images, designs, text, etc., to match the label characteristics provided by the algorithm. The proximity to the target vector of label characteristics could be measured by application of DTW with the goal of achieving an alignment cost of zero. Samples of the wine label can be sent out at any step to obtain a label characteristic panel (e.g., a set of characteristics evaluated by an independent team of designers) to determine/judge the value of the various label parameters (including both objective and subjective criteria) such as traditional versus modern style, abstract versus figurative, bold versus subdued, so that adjustments can be made. In disclosed embodiments, a phantom wine label might be produced and used in a DTW alignment to known wine labels to obtain the next best choice relative to the phantom wine label. The label selected in this manner can then be used as a model/template for designing a new label for a different wine.

Figure 5:
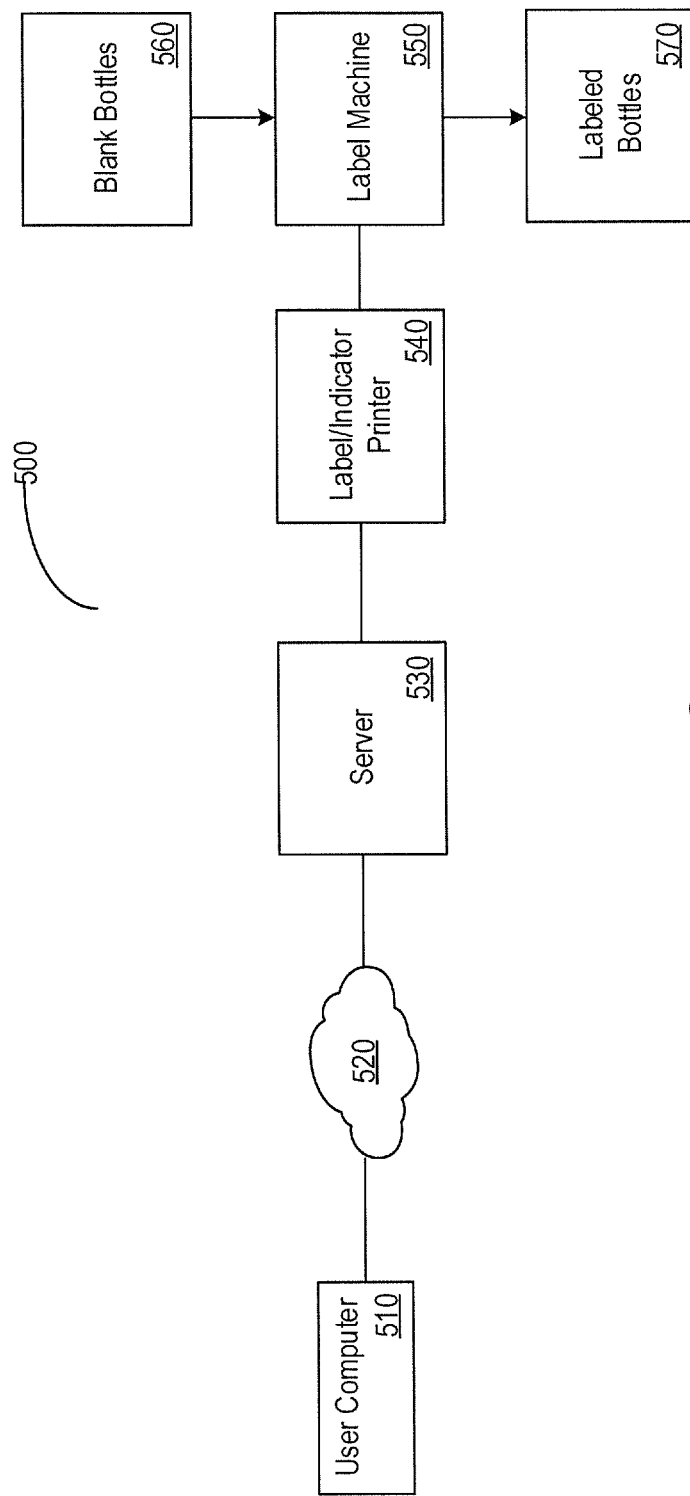
FIG. 5 depicts an embodiment of a system for the controlled labeling of individual products on an item-by-item basis in a continuous production process.

FIG. 5 depicts an embodiment of a system 500 for the controlled, e.g., randomized, labeling of individual products on an item-by-item basis in a continuous production process. A computer 510 is connected to a server 530 of the labeling system 500 via a network 520. The business user may use a web browser to access a user interface of the labeling system 500. The user interface allows the business user to select and customize the labeling. For example, the business user may select a random trial of three different labels for a production run of a particular wine. The method includes generating, using a server, a testing interface displayed on a web browser running on a user's computer connected to the server via a network. One or more label images, selected or submitted by the user via the testing interface, are specified in correspondence with one or more ordered products. The label images are transmitted to a printer, the label images being grouped according to user's specifications. The method further includes printing, by the printer, the label images and the indicator label image to produce one or more printed product labels and a printed indicator label. The printed product labels and the printed indicator label are transferred to a labeling machine. The method further includes controlling a conveyor system to release a sequence of unlabeled products based on the product identifiers corresponding to the products. The printed product labels are applied to the unlabeled products, the system comprising a label for consumer items, such as, for example, bottles of wine.

The server 530 is in communication with a label/indicator printer 540 which prints the labels on a roll of blank adhesive-backed labels in a continuous stream. The output of the printer 540 may also include indicator labels which perform particular functions, as discussed in further detail below. The stream of printed labels/indicators from the printer 540 is fed into a labeling machine, either in a continuous or batch manner. The labeling machine 550 receives an input of unlabeled, or partially labeled, filled wine bottles 560, attaches the appropriate label to each bottle 560 and outputs labeled bottles 570 to be shipped to the customers. As discussed in further detail below, the labeling machine 550 reads indicator labels included in the stream of printed labels from the printer 540 to determine how to match each label with the correct bottle of wine and the correct customer order.

In disclosed embodiments, a roll of blank labels feeds into the printer, e.g., a roll which is hundreds of feet long and stored on a separate unwinding unit. In disclosed embodiments, the roll of labels is unspooled and fed into the printer. The printed labels may pass directly from the output of the printer to a labeling machine (or subsystem) for application to the bottles. Alternatively, the printed labels may be stored on a winder and moved to the labeling machine/subsystem in batches.

In disclosed embodiments, the printed labels may be transferred between the printer and the labeling machine in batches. For example, the printed labels may be rolled up on a spool as they are printed. The continuous stream of labels may be cut at determined points to form batches. A batch indicator label may be used to determine the predetermined point at which the roll of labels is to be cut. The batch roll is then transferred to the labeling machine and set up to feed the labeling machine. The indicator labels of the batch may be read to determine a sequence of wine bottles to be placed on the conveyor for labeling. In disclosed embodiments, the labels are printed in the reverse order with respect to the order in which they are to be applied to the bottles because the first label read from the spool, i.e., unwound from the spool by the labeling machine, is the last label that was printed. The reading of the batch and indicator labels may be done using a bar code or other scannable code. The batch and indicator labels may also have the information in text form.

Figure 6:
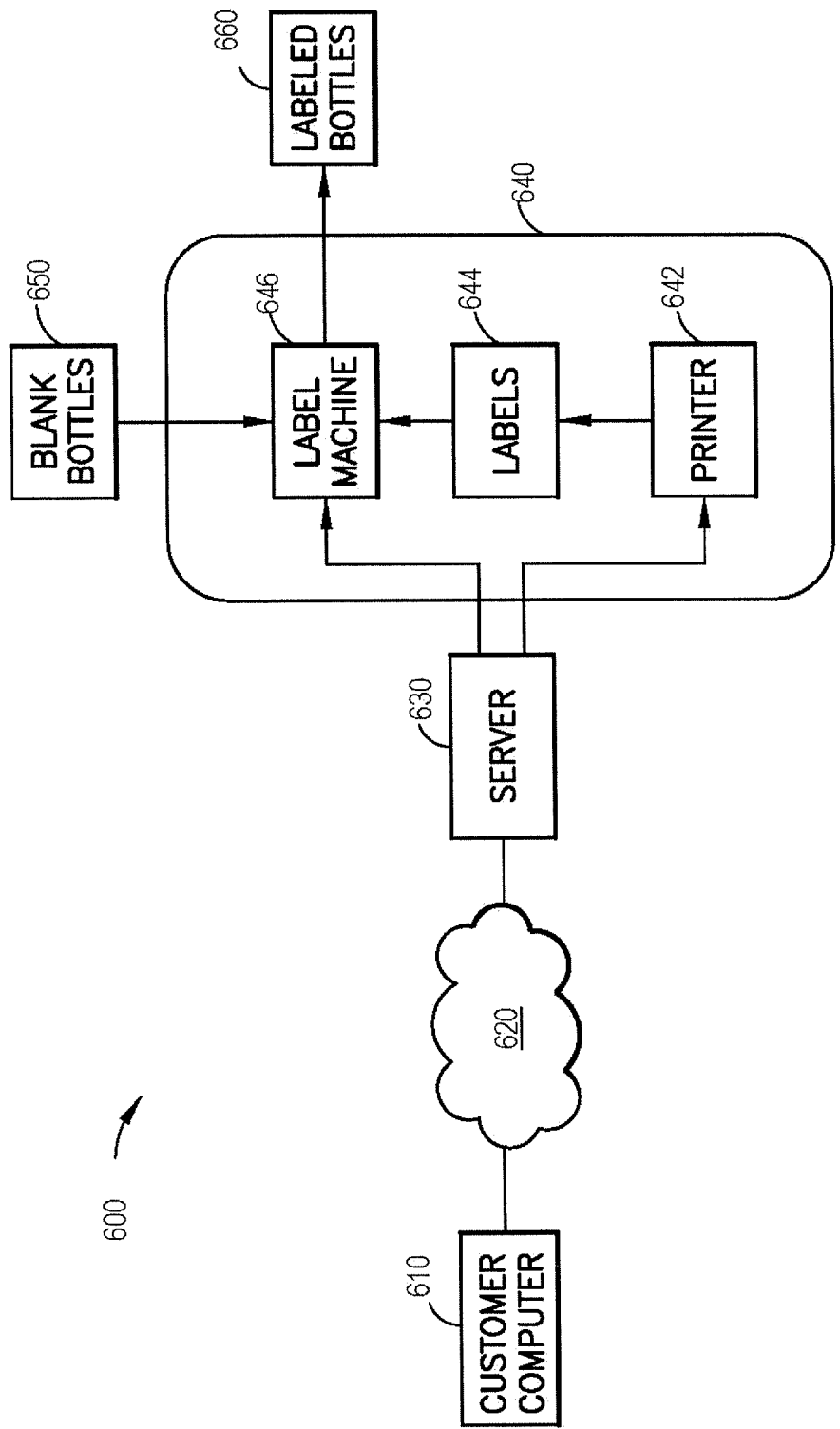
FIG. 6 depicts an embodiment of a system for the random labeling and label recipient correlation of products on an item-by-item basis in a continuous production process.

FIG. 6 depicts an embodiment of a system 600 for the random labeling and label recipient correlation of products on an item-by-item basis in a continuous production process.

As in the embodiment of FIG. 5, a user computer 610 is connected to a server 630 of the labeling system 600 via a network 620. The business user may use a web browser to access a user interface of the labeling system 600. The server 630 is in communication with a label printer 642 which prints the labels on a roll of blank adhesive-backed labels in a continuous stream. The stream of printed labels 644 may also include indicator labels which perform particular functions which are discussed in further detail below. The stream of printed labels/indicators 644 is fed into a labeling machine 646 in a continuous manner. The labeling machine 646 receives an input of unlabeled, or partially labeled, filled wine bottles 650, attaches the appropriate label to each bottle 650 and outputs labeled bottles 660 to be shipped to the customers. The server 630 controls the printing of the labels by the printer 642. The server 630 also provides information to, or directly controls, the labeling machine 646 to match each label with the correct bottle of wine and the correct customer order.

Figure 7:
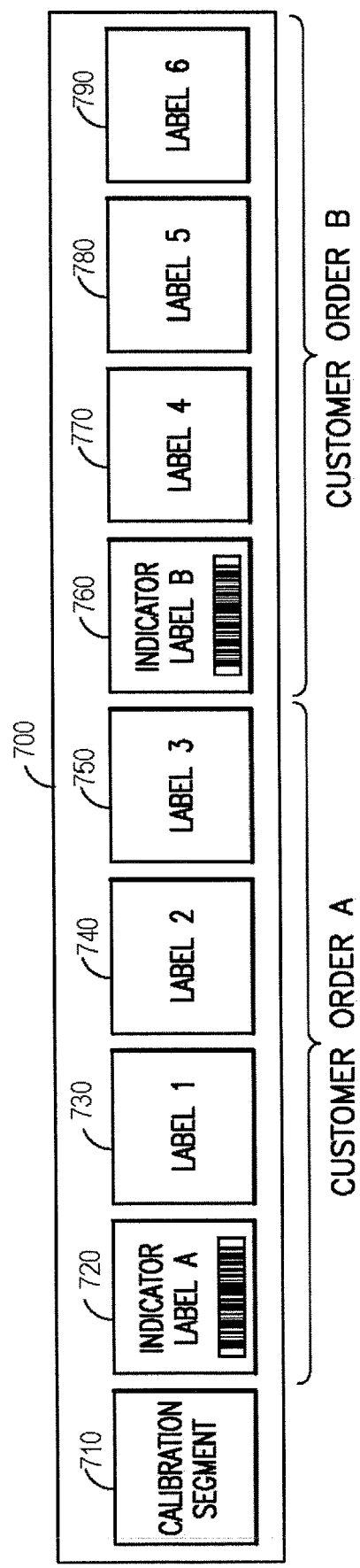
FIG. 7 depicts a portion of a continuous stream of printed labels and indicators for random labeling and label recipient correlation of wine bottles.

FIG. 7 depicts a portion of a continuous stream of printed labels and indicators 700 for random labeling and label recipient correlation of wine bottles. The printed labels and indicators 700 may be led by a batch indicator 710 indicating the beginning of a batch of customer orders. Indicator Label A 720 may indicate the beginning of Customer Order A, which may include, for example, three labels (730, 740, and 750). Indicator Label B 760 may follow to indicate the beginning of Customer Order B, which may include three labels (770, 780, and 790). Although this example shows three labels, the number of labels in an order may vary.

The stream of printed labels may also include order indicator labels and batch indicator labels between labels associated with specific customer orders. The order indicator labels provide information which, inter alia, makes it clear that a set of labels (and associated wine bottles) constitute a complete order and should go in one box together. The order indicator labels also make it clear that a specific number of bottles belong to a specific customer and provide the labeling sequence of the wines so that each label, i.e., label version, is attached to the proper bottle of wine. For example, the indicator (or "spacer") label may have information indicating: "Customer ID=12345; Order=3 bottles; L1=a selected rosé wine, L2=a selected white wine; L3=a selected red wine." The information may be encoded in the form of a bar code or other type of scannable code. In disclosed embodiments, the indicator label includes both printed information and a scannable code so that the information can be easily available to human handlers and machines. In disclosed embodiments, the warehouse for handling the bottled wine, before and after labeling, uses a barcode-based system, so barcodes related to the order on the indicator labels would be readable by the same system used to store and move bottled wine in the warehouse.

In disclosed embodiments, Customer Order A and Customer Order B may include the same three wines (i.e., identical brand and type) but the wines may have different labels for each customer. For example, Customer Order A may include a bottle of white wine with Label 2 and Customer Order B may include an identical bottle of white wine with Label 5. By virtue of the order indicator labels and batch indicator labels between labels associated with specific customer orders, the system can accurately provide label recipient correlation, i.e., a record of which customers have received which labels. Furthermore, the white wines may be identified with different SKUs, each of which can be associated with a specific version of a label, e.g., Label 2 or Label 5, to allow SKU-based distribution information to be accurately correlated with the particular labels on each product.

The indicator label helps to ensure that the order is correct, but also helps ensure that other orders are not subjected to errors. For example, if a wine bottle label were to be misprinted and become wrinkled and lost, a first customer's order of three bottles would receive only two correct labels and then the first label of a second customer's order might be applied to the third bottle. This could cause all of the remaining orders to be shifted by one bottle and, thus, incorrect. The indicator label helps to avoid this situation by calibrating the intervals between orders. As noted above, the indicator label also helps to ensure that the bottles and labels of each customer's order is properly aligned.

Figure 8B:
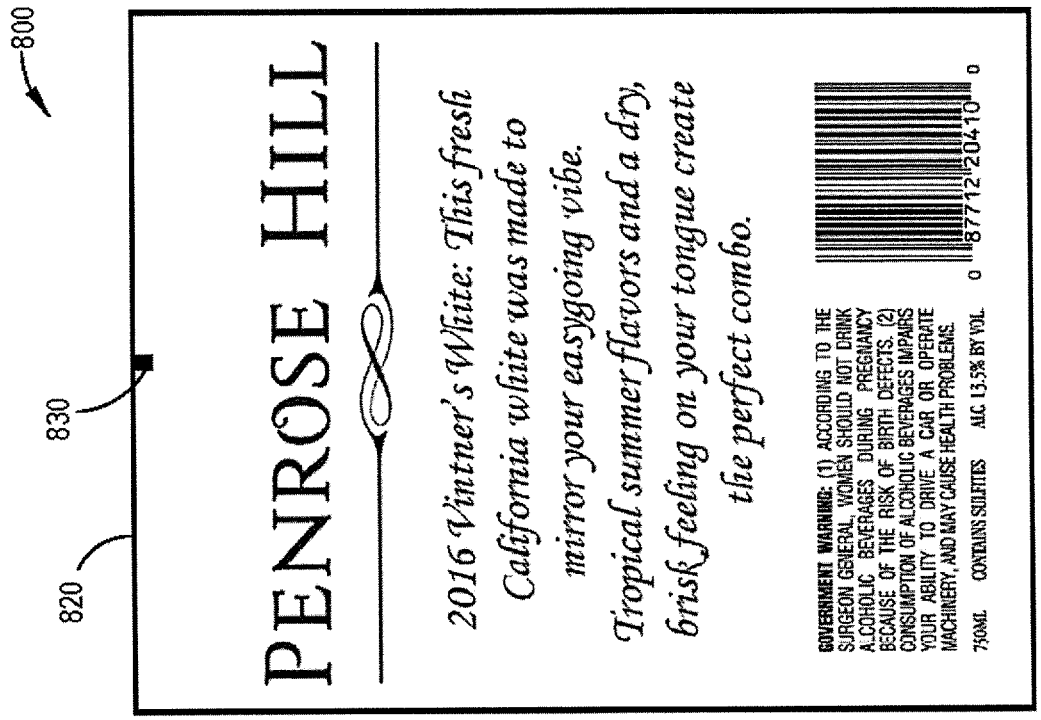
FIGS. 8A and 8B show an example of a front label and a back label, respectively, to be applied to a wine bottle.
Figure 8A:
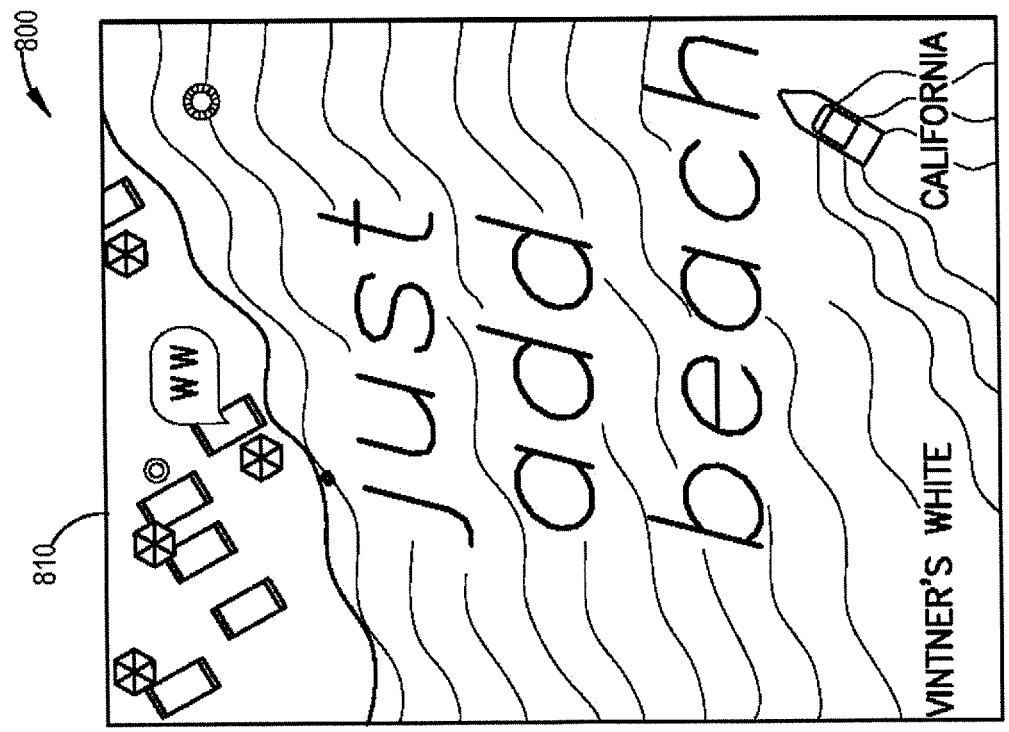

FIGS. 8A and 8B show an example of a front label 810 and a back label 820, respectively, to be applied to a wine bottle. In disclosed embodiments, the printer prints a continuous roll of labels which passes from the output of the printer into the input of the labeling machine. The roll is read (e.g., optically) by the labeling machine to determine the proper sequence for releasing bottles of each type of wine onto the labeling conveyor. Alternatively, a server in communication with the printer and the labeling machine may transmit the indicator label information directly to the labeling machine to allow it to control the bottle-feeding conveyors. It is also possible for at least part of the labeling machine, e.g., the gates, to be controlled directly by the server.

In disclosed embodiments, the back label 820 (see, e.g., FIG. 8B) is applied to the wine bottle when the wine is produced, i.e., the bottles each have a back label but no front label. The front label 810 (see, e.g., FIG. 8A), which may be a version of a randomized label, is applied during the process discussed above before the wine is packed and shipped. The front label 810 should be applied only to bottles with a properly corresponding back label 820 (e.g., both must be rosé labels). Furthermore, the front label should be applied in a position precisely opposite to the back label. In disclosed embodiments, guide lines 830 may be printed on each back label 820, such as, for example, in a bleed area on the outer edge of the label. The printed guide lines are read (e.g., optically) by the labeling machine. Based on the guide lines, the labeling machine is configured to properly align the bottle (e.g., rotate the bottle about its longitudinal axis) to receive the front label 810 in the proper position directly opposite the back label. In disclosed embodiments, the front and back labels may be applied at the same time, in which case the labeling machine will apply the front and back labels directly opposite one another without the need for alignment guide lines.

As a practical matter, there are advantages to applying the back label before and separately from the application of the front label 810. Wine is typically made in large batches, e.g., in tanks, and then bottled. Moving the wine out of a winery in bottles is easier, from a regulatory point of view, if the bottles already have the legally required Surgeon General's warning (see FIG. 8B) and necessary legal disclaimers on the back label. Alternatively, the labeling system could be set up inside the bonded premises of a winery, in which case the front and back labels could be applied at the same time, as discussed above.

In disclosed embodiments, a high-scale facility, such as a winery, may be used to bottle large quantities of different types of wine to be labeled using the disclosed labeling system. In such a case, the filled bottles may be moved in bond (so that a back label is not necessary), which requires that the bottles are physically wrapped together in quantities for shipment and a barcode is applied to the outside of each shipping pallet. Bonded areas may be created in each of a number of distributed packing warehouses, and the shipped pallets of filled bottles may be unpacked in the bonded areas and labeled using the disclosed labeling system. In such a case, the labeling system would be set up within the bonded area, and the filled bottles would be labeled on the front and back at the same time. The bottles would be brought out of bond after labeling and would already be inside the packing warehouse ready for packing and shipment.

Filled bottles of wine having a back label already attached may be identified by that label, which may have a barcode. In some cases, the filled wine bottles may be easily identifiable, e.g., by color, if only one red wine, one white wine, and one rosé are offered. Otherwise, the cases of bottled wines are barcoded. In disclosed embodiments, each bottle is barcoded, each case of bottles is barcoded, and each pallet of cases is barcoded, each barcoded configuration having a separate SKU which identifies the type and quantity of the product.

In disclosed embodiments, a group of pallets, e.g., 10, 20, or 50 pallets, may contain a particular type of wine, such as red or rosé. The pallets may be stored in pallets racks. The pallets may be barcoded, as well as the corresponding pallet rack locations. The ordering subsystem could produce directions for a forklift driver to pick up a particular pallet for labeling. The operator would read the barcode on the pallet to verify that the pallet was in the correct position, and then would transport the pallet to the input of the appropriate (i.e., associated with the correct SKU) conveyor of filled wine bottles. The shrink wrap would be removed and the bottles would be manually or automatically loaded onto the conveyor for the specific wine type (i.e., for the specific SKU).

In disclosed embodiments, a quality control check of the labeled bottles may be performed to ensure that the correct labels have been properly applied to each bottle. This process may be made more efficient by providing an indicator, e.g., a small barcode in the bottom corner of each label, front and back, which could be optically read and checked in that manner.

In disclosed embodiments, the server detects that a label for a particular type of wine, e.g., a white wine, is being printed (or is about to be printed or has just been printed, depending upon the relative timing of the printer and the labeling machine) and sends a signal to a controller of the labeling machine (or directly controls the labeling machine) to release a bottle of white wine onto the labeling conveyor. In such an arrangement, instead of receiving a stream of labels, reading them, and then controlling the gate, the server will already have informed the labeling machine of the sequence of wine types which are coming up for labeling. For example, the server could indicate that, e.g., five bottles from now, a white wine bottle must be labeled. The controller of the labeling machine (or the server) controls the gate mechanisms based on a known or measured lag time between the release of a particular bottle from the conveyors of filled wine bottles and the actual labeling of the particular bottle. Thus, in disclosed embodiments, there are two different ways to operate the labeling machine: one in which printed labels are optically read as they are received by the subsystem; and one in which the server signals the labeling machine when to release a particular type of filled bottle of wine.

Figures 9A, 9B:
FIGS. 9A and 9B show an example of two versions of a front label to be applied to wine bottles for distribution.

FIGS. 9A and 9B show an example of, respectively, a first and a second version of a front label to be applied to wine bottles for distribution. As explained above, the system includes a labeling subsystem which is adapted to label a first group of a wine bottles with a first label version and a second group of wine bottles with a second label version. In this example, two labels, i.e., a first label version and a second label version, will be described as being randomly applied to the wine bottles, but any number of different labels may be used, subject to practical considerations relating to the labeling system and the size of production run. Furthermore, distributions other than random distributions are also possible because the system can precisely determine the specific wine bottles being labeled with a specific label. Therefore, a particular label version, or versions, can be sent to a specific subset of customers, if this is useful for testing purposes. For example, the general distribution of a product could be done with a first label version, while a specific subset of customers receives a random distribution of the first label version and the second label version, and vice versa.

The labels may be characterized using a number of parameters, such as, for example, grape variety font type, grape variety font size, grape variety font color, grape variety vertical position, winery font type, winery font size, winery font color, winery vertical position, origin font type, origin font size, origin font color, origin vertical position, background color, etc. In this embodiment, the first label version (FIG. 9A) has the grape variety in a central vertical position in a non-script font and the winery in a upper vertical position in a script font. The second label version (FIG. 9B), on the other hand, has the grape variety in an upper vertical position in a script font and the winery in a central vertical position in a non-script font. The bottles of wine being labeled with these two alternative labels are identical in this example. The distribution of the wine to customers may involve sending wine bottles labeled with the first or second label version randomly to wine club customers. The customers may not be aware that there is more than one version of the label. Therefore, any differences in user ratings received from the customers, once correlated to the label version they received, are indicative of the customers' reaction to the label, as opposed to the wine itself. The results of such a test distribution, with label version recipient correlation (i.e., based on stored information as to which customers received which label version), can be used to select label characteristics which improve the user ratings of a product. This, in turn, may result in increased sales for the product in question once it has been labeled with a label version having the characteristics obtained in this manner.

In disclosed embodiments, an apparatus may be provided which comprises a general-purpose or special-purpose computing apparatus and which may execute program code to perform any of the functions described herein. The apparatus may comprise an implementation of one or more elements of the system 10, 100. The apparatus may include additional elements which are not mentioned below, according to some embodiments.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 11:
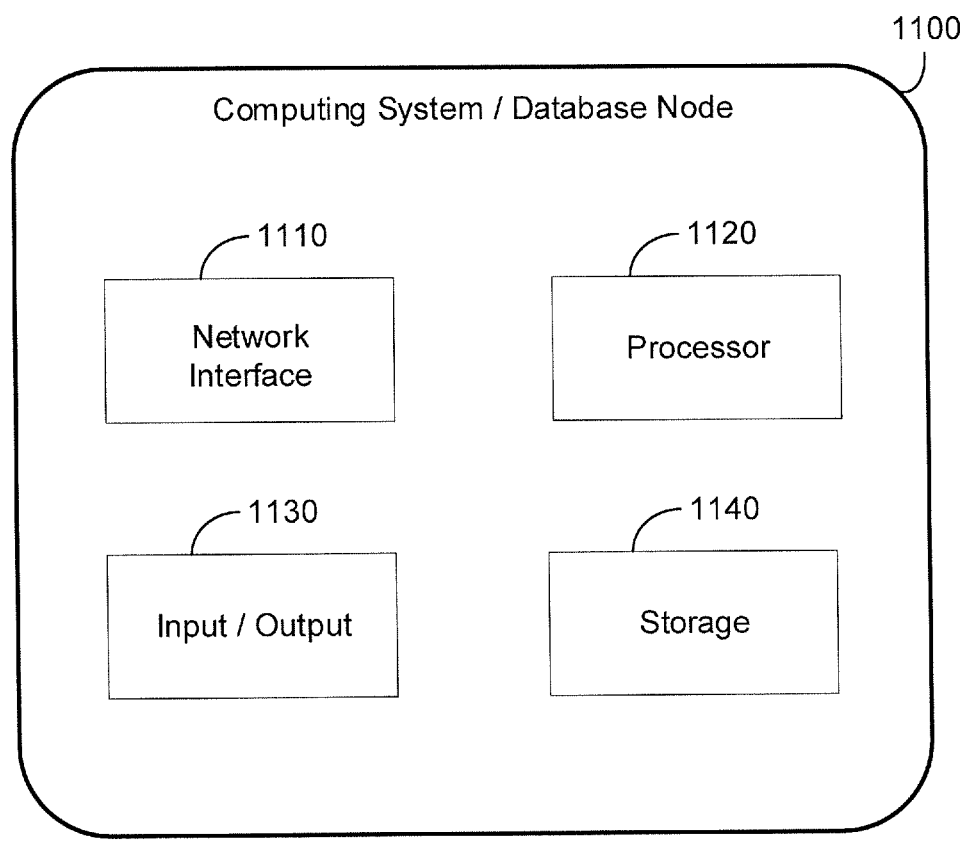
FIG. 11 is a diagram illustrating a computing system for use in the example embodiments described herein.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 11 illustrates an example computing system 1100 which may represent or be integrated in any of the above-described components, etc. FIG. 11 is not intended to suggest any limitation as to the scope of use or functionality of embodiments described herein. The computing system 1100 is capable of being implemented and/or performing any of the functionality set forth hereinabove.

The computing system 1100 may include a computer system/server, which is operational with numerous other general purpose or special purpose computing system environments or configurations. Examples of well-known computing systems, environments, and/or configurations that may be suitable for use as computing system 800 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 1100 may be a web server, a label data/test platform, or a labeling/distribution system (such as shown in FIG. 1), a server, CPU, or the like configured to perform a function as described herein.

The computing system 1100 may be described in the general context of computer system-executable instructions, such as program modules, being executed by a computer system. Generally, program modules may include routines, programs, objects, components, logic, data structures, and so on that perform particular tasks or implement particular abstract data types. The computing system 1100 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 11, the computing system 1100 is shown in the form of a general-purpose computing device. The components of computing system 1100 may include, but are not limited to, a network interface 1110, one or more processors or processing units 1120, an output 1130 which may include a port, an interface, etc., or other hardware, for outputting a data signal to another device such as a display, a printer, etc., and a storage device 1140 which may include a system memory, or the like. Although not shown, the computing system 1100 may also include a system bus that couples various system components including system memory to the processor 1120.

The storage 1140 may include a variety of computer system readable media. Such media may be any available media that is accessible by computer system/server, and it may include both volatile and non-volatile media, removable and non-removable media. System memory, in one embodiment, implements the processes described herein. The system memory can include computer system readable media in the form of volatile memory, such as random-access memory (RAM) and/or cache memory. As another example, storage device 1140 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 1140 may include at least one program product having a set (e.g., at least one) of program modules that are configured to carry out the functions of various embodiments of the application.

As will be appreciated by one skilled in the art upon reading this disclosure, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 1100 may also communicate with one or more external devices such as a keyboard, a pointing device, a display, etc.; one or more devices that enable a user to interact with computer system/server; and/or any devices (e.g., network card, modem, etc.) that enable computing system 1100 to communicate with one or more other computing devices. Such communication can occur via I/O interfaces. Further, computing system 1100 can communicate with one or more networks such as a local area network (LAN), a general wide area network (WAN), and/or a public network (e.g., the Internet) via network interface 1110. As depicted, network interface 1110 may also include a network adapter that communicates with the other components of computing system 1100 via a bus.

Although not shown, other hardware and/or software components could be used in conjunction with the computing system 1100. Examples include, but are not limited to: microcode, device drivers, redundant processing units, external disk drive arrays, RAID systems, tape drives, and data archival storage systems, etc.

According to various embodiments, the computing system 1100 may generate data that can be used to predict or determine which consumable (such as wine) a user may enjoy based on data associated with a known consumable. In general, the computing system 1100 may be used to implement any of the processes or analyses described elsewhere herein.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

We claim:

1. A computer-implemented method, the method comprising:
   receiving a plurality of panels of label characteristics for a first product, each panel of label characteristics being associated with one or more label characteristics each having a value characterizing a label for the first product;
   building a plurality of different executable machine learning models, each of the plurality of machine learning models being trained on at least a subset of the received panels of label characteristics for the first product;
   storing the plurality of trained machine learning models in a storage device;
   receiving an indication of a selection of one or more second products, each of the second products having an associated defined panel of label characteristics;
   executing at least one of the plurality of trained machine learning models using the panels of label characteristics associated with the products in the received indication of the selection of the one or more second products as inputs to the at least one trained machine learning model execution to generate an output derived from the panels of label characteristics associated with the selection of one or more second products, wherein the plurality of different executable machine learning models includes at least one of a Gaussian Mixture Model (GMM) to generate an algorithmic version of a panel for a product in the received indication of the selection of the one or more second products and the at least one of the plurality of trained machine learning models executed is the GMM, where an input to the GMM is a panel for a product in the received indication of the selection of the one or more second products the GMM generates the algorithmic version of the panel for a product in the received indication of the selection of the one or more second products that fits within a distribution of label characteristics defined for the panels of label characteristics associated with the products in the received indication of the selection of the one or more second products; and
   storing a result set based on the generated output in a database, wherein the generated algorithmic version of the panel for a product in the received indication of the selection of the one or more second products defines a panel template that is used as a basis to design a label.

2. The method of claim 1, wherein the first product and the second product are wine, including bottles of wine distributed via at least one of a website, a physical store, and a wine club.

3. The method of claim 1, wherein each panel of label characteristics is identified by a unique identifier that is further associated with one of the first and second products.

4. The method of claim 1, wherein a controller controls a product labeling device, the product labeling device including at least one of a labeling system interface, a labeling system processor, a label printer, and a label applicator.

5. The method of claim 1, wherein the plurality of different executable machine learning models further includes at least one of a Dynamic Time Warping model to determine how different the chemistry panels for the consumable items are from each other, a user level model to provide a recommendation to a user, and a deep learning model to perform at least one function based on the panels of label characteristics for the one or more second products.

6. The method of claim 1, wherein the input to the GMM of a panel for a product in the received indication of the selection of the one or more second products is determined based, at least in part, on a user input.

7. A system comprising:
   a processor;
   a storage device; and
      a memory in communication with the processor, the memory storing program instructions, the processor operative with the program instructions to perform the operations of:
   receiving a plurality of panels of label characteristics for a first product, each panel of label characteristics being associated with one or more label characteristics each having a value characterizing a label for the first product;
   building a plurality of different executable machine learning models, each of the plurality of machine learning models being trained on at least a subset of the received panels of label characteristics for the first product;
   storing the plurality of trained machine learning models in a storage device;
   receiving an indication of a selection of one or more second products, each of the second products having an associated defined panel of label characteristics;
   executing at least one of the plurality of trained machine learning models using the panels of label characteristics associated with the products in the received indication of the selection of the one or more second products as inputs to the at least one trained machine learning model execution to generate an output derived from the panel of label characteristics associated with the selection of one or more second products, wherein the plurality of different executable machine learning models includes at least one of a Gaussian Mixture Model (GMM) to generate an algorithmic version of a panel for a product in the received indication of the selection of the one or more second products and the at least one of the plurality of trained machine learning models executed is the GMM, where an input to the GMM is a panel for a product in the received indication of the selection of the one or more second products and the GMM generates the algorithmic version of the panel for a product in the received indication of the selection of the one or more second products that fits within a distribution of label characteristics defined for the panels of label characteristics associated with the products in the received indication of the selection of the one or more second products; and storing a result set based on the generated output in a database, wherein the generated algorithmic version of the panel for a product in the received indication of the selection of the one or more second products for the second product item defines a panel template that is used as a basis to design a label.

8. The system of claim 7, wherein the first product and the second product are wine, including bottles of wine distributed via at least one of a website, a physical store, and a wine club.

9. The system of claim 7, wherein each panel of label characteristics is identified by a unique identifier that is further associated with one of the first and second products.

10. The system of claim 7, wherein a controller controls a product labeling device, the product labeling device including at least one of a labeling system interface, a labeling system processor, a label printer, and a label applicator.

11. The system of claim 7, wherein the plurality of different executable machine learning models further includes at least one of a Dynamic Time Warping model to determine how different the chemistry panels for the consumable items are from each other, a user level model to provide a recommendation to a user, and a deep learning model to perform at least one function based on the panels of label characteristics for the one or more second products.

12. The system of claim 7, wherein the input to the GMM of a panel for a product in the received indication of the selection of the one or more second products is determined based, at least in part, on a user input.

13. A non-transitory computer readable medium having stored therein instructions that when executed cause a computer to perform a method comprising:
receiving a plurality of panels of label characteristics for a first product, each panel of label characteristics being associated with one or more label characteristics each having a value characterizing a label for the first product;
building a plurality of different executable machine learning models, each of the plurality of machine learning models being trained on at least a subset of the received panels of label characteristics for the first product;
storing the plurality of trained machine learning models in a storage device;
receiving an indication of a selection of one or more second products, each of the second products having an associated defined panel of label characteristics;
executing at least one of the plurality of trained machine learning models using the panels of label characteristics associated with the products in the received indication of the selection of the one or more second products as inputs to the at least one trained machine learning model execution to generate an output derived from the panel of label characteristics associated with the selection of one or more second products, wherein the plurality of different executable machine learning models includes at least one of a Gaussian Mixture Model (GMM) to generate an algorithmic version of a panel for a product in the received indication of the selection of the one or more second products and the at least one of the plurality of trained machine learning models executed is the GMM, where an input to the GMM is a panel for a product in the received indication of the selection of the one or more second products and the GMM generates the algorithmic version of the panel for a product in the received indication of the selection of the one or more second products that fits within a distribution of label characteristics defined for the panels of label characteristics associated with the products in the received indication of the selection of the one or more second products; and
storing a result set based on the generated output in a database, wherein the generated algorithmic version of the panel for a product in the received indication of the selection of the one or more second products defines a panel template that is used as a basis to design a label.

14. The medium of claim 13, wherein the first product and the second product are wine, including bottles of wine distributed via at least one of a website, a physical store, and a wine club.

15. The medium of claim 13, wherein each panel of label characteristics is identified by a unique identifier that is further associated with one of the first and second products.

16. The medium of claim 13, wherein a controller controls a product labeling device, the product labeling device including at least one of a labeling system interface, a labeling system processor, a label printer, and a label applicator.

17. The medium of claim 13, wherein the plurality of different executable machine learning models includes at least one of a Dynamic Time Warping model to determine how different the chemistry panels for the consumable items are from each other, a user level model to provide a recommendation to a user, and deep learning model to perform at least one function based on the panels of label characteristics for the one or more second products.

18. The medium of claim 13, wherein the input to the GMM of a panel for a product in the received indication of the selection of the one or more second products is determined based, at least in part, on a user input.

* * * * *